United States Patent [19]

Ando et al.

[11] Patent Number: 5,889,124
[45] Date of Patent: Mar. 30, 1999

[54] CURABLE RESIN COMPOSITION

[75] Inventors: Katsuhiro Ando, Akashi; Jun Hattori, Takasago; Toshifumi Hirose, Kobe, all of Japan

[73] Assignee: Kaneka Corporation, Osaka, Japan

[21] Appl. No.: 812,927

[22] Filed: Mar. 4, 1997

[30] Foreign Application Priority Data

Mar. 4, 1996 [JP] Japan ..................................... 8-045972

[51] Int. Cl.⁶ ........................... C08G 65/32; C08L 71/02
[52] U.S. Cl. ........................ 525/403; 525/405; 525/407; 525/408; 525/476
[58] Field of Search .................................. 525/403, 405, 525/407, 408, 476

[56] References Cited

U.S. PATENT DOCUMENTS

| | | | |
|---|---|---|---|
| 3,632,557 | 1/1972 | Brode et al. | 260/77.5 |
| 4,345,053 | 8/1982 | Rizk et al. | 525/440 |
| 4,353,819 | 10/1982 | McFadden | 523/454 |
| 4,366,307 | 12/1982 | Singh et al. | 528/373 |
| 4,960,844 | 10/1990 | Singh | 528/17 |
| 4,981,728 | 1/1991 | Homma et al. | 427/386 |
| 5,296,582 | 3/1994 | Fujita et al. | 528/27 |
| 5,684,094 | 11/1997 | Suziki et al. | 525/403 |

FOREIGN PATENT DOCUMENTS

| | | |
|---|---|---|
| 0 671 437 | 9/1995 | European Pat. Off. . |
| 63-273629 | 11/1988 | Japan . |
| 4-1220 | 1/1992 | Japan . |

OTHER PUBLICATIONS

Holm, "Ketimines a Latent Epoxy Curing Agents", Journal of Paint Technology, vol. 39, No. 504, (1967) pp. 385–388.

*Primary Examiner*—Randy Gulakowski
*Attorney, Agent, or Firm*—Foley & Lardner

[57] ABSTRACT

A curable resin composition containing (a) an oxyalkylene polymer which comprises at least one silicon-containing group having at least one hydroxyl or hydrolyzable group bonded to a silicon atom, (b) an epoxy resin, (c) a ketimine compound and (d) a carbonyl compound, which has improved storage stability.

5 Claims, No Drawings

CURABLE RESIN COMPOSITION

BACKGROUND OF THE INVENTION

1. Field of the Invention

The present invention relates to a one pack type curable resin composition which comprises an epoxy resin and an oxyalkylene polymer comprising at least one silicon-containing group having at least one hydroxyl or hydrolyzable group bonded to a silicon atom and being crosslinkable through the formation of a siloxane bond (hereinafter referred to as a "reactive silicon-containing group"), and which is curable with moisture or water.

2. Description of the Related Art

Epoxy resins are widely used in the fields of molding materials, adhesives, paints, plywoods, laminates, and the like. However, they suffer from some problems that their cured materials are brittle and that their peeling strength is low when they are used as adhesives.

Oxyalkylene polymers comprising one or more reactive silicon-containing groups are cured at room temperature and provide rubbery elastomers and exhibit good adhesion properties. However, their applications are limited since their cured materials have low mechanical properties.

Thus JP-A-61-247723, JP-A-61-268720 and U.S. Pat. No. 4,657,986 propose curable resin compositions comprising an epoxy resin and an oxyalkylene polymer to improve the brittleness of the cured material of the former and the mechanical strength of the cured material of the latter. However, most of the proposed compositions are two pack type composition comprising a main ingredient comprising the resins and a curing agent, and have inferior workability to a one pack type composition. Recently, JP-A-63-273629, JP-A-4-1220 and JP-A-5-271389 propose one pack type curable compositions containing a mixture of a main ingredient and curing agents including ketimines as curing agents for the epoxy resins.

However, these one pack type resin compositions do not have satisfactory storage stability since they suffer from increase of viscosity and gelation even under conditions being shut off from atmospheric water.

SUMMARY OF THE INVENTION

An object of the present invention is to provide a one pack type curable resin composition which comprises an epoxy resin, an oxyalkylene polymer having at least one reactive silicon-containing group and a ketimine and has good storage stability.

Accordingly, the present invention provides a curable resin composition comprising (a) an oxyalkylene polymer which comprises at least one silicon-containing group having at least one hydroxyl or hydrolyzable group bonded to a silicon atom (reactive silicon-containing group), (b) an epoxy resin, (c) a ketimine compound, (d) a carbonyl compound, (e) optionally a curing catalyst for the oxyalkylene polymer (a), and (f) optionally a compound having a reactive silicon-containing group other than the oxyalkylene polymer (a).

DETAILED DESCRIPTION OF THE INVENTION

The backbone of the oxyalkylene polymer (a) contained in the curable resin composition of the present invention comprises a repeating unit of the formula (1):

$$-R^1-O- \quad (1)$$

wherein $R^1$ is a divalent organic group.

Preferably, $R^1$ in the formula (1) is a liner or branched alkylene group having 1 to 14 carbon atoms, in particular, 2 to 4 carbon atoms.

Specific examples of the repeating unit of the formula (1) are $-CH_2O-$, $-CH_2CH_2O-$, $CH_2CH(CH_3)O-$, $-CH_2CH(C_2H_5)O-$, $-CH_2C(CH_3)_2O-$, $-CH_2CH_2CH_2CH_2O-$ and the like.

The backbone of the oxyalkylene polymer (a) may consist of one kind of the repeating unit or comprise at least two kinds of the repeating units. In particular, polymers comprising propylene oxide repeating units are preferable.

The reactive silicon-containing group in the oxyalkylene polymer (a) has the hydroxyl or hydrolyzable group bonded to the silicon atom and can be crosslinked through the formation of a siloxane bond.

A typical example of the reactive silicon-containing group is a group of the formula (2):

wherein R2 and R3 are the same or different and represent a $C_{1-20}$ alkyl group, a $C_{6-20}$ aryl group, a $C_{7-20}$ aralkyl group or a triorganosiloxy group of the formula: $R^4_3SiO-$ in which $R^4$ is a $C_{1-20}$ monovalent hydrocarbon group provided that three $R^4$ groups may be the same or different, with the proviso that when at least two $R^2$ or $R^3$ groups are present, they may be the same or different; X is a hydroxyl or hydrolyzable group with the proviso that when at least two X groups are present, they may be the same or different; a is 0, 1 or 2; b is 0, 1, 2 or 3; p is an integer of 0 to 19; and "a" in the different $-SiR^2_{2-a}X_aO-$ groups (3) may be the same or different with the proviso that the sum of all "a" and "b" is at least 1 (one).

The hydrolyzable group for X is not limited, and may be any conventional hydrolyzable group. Specific examples of the hydrolyzable group are a hydrogen atom, halogen atoms, alkoxy, acyloxy, ketoximate, amino, amide, acid amide, aminoxy, mercapto and alkenyloxy groups. Among them, a hydrogen atom and alkoxy, acyloxy, ketoximate, amino, amide, aminoxy, mercapto and alkenyloxy groups are preferable. In particular, an alkoxy group is preferable since it is mildly hydrolyzed and easily handled.

One, two or three hydroxy and/or hydrolyzable groups can be bonded to one silicon atom, and the sum of all "a" and "b" is preferably between 1 and 5. When two or more hydroxyl and/or hydrolyzable groups are bonded to the reactive silicon-containing group, they may be the same or different.

The reactive silicon-containing group has at least one silicon atom in a group. When the silicon atoms are bonded through the siloxane bond and the like, the number of silicon atoms is about 20 or more.

Preferably, the reactive silicon-containing group is a group of the formula (4):

wherein $R^3$, X and b are the same as defined above because of easy availability.

Specific examples of $R^2$ and $R^3$ in the above formulas (2), (3) and (4) are alkyl groups (e.g. methyl, ethyl, etc.), cycloalkyl groups (e.g. cyclohexyl, etc.), aryl groups (e.g.

phenyl, etc.), aralkyl groups (e.g. benzyl, etc.), triorganosiloxy groups of the formula: $R^4{}_3SiO—$ in which R4 is a hydrocarbon group such as methyl or phenyl. In particular, $R^2$ and $R^3$ are both methyl groups.

The reactive silicon-containing group can be introduced in the polymer by any conventional method. Examples of such method are as follows:

(i) With an oxyalkylene polymer having functional groups such as hydroxyl groups in a molecule, an organic compound having an unsaturated group and an active group which is reactive with the functional groups of the oxyalkylene polymer is reacted, and an oxyalkylene polymer having an unsaturated group is obtained. Alternatively, an oxyalkylene polymer having unsaturated groups is prepared by copolymerizing and alkylene oxide and an epoxy compound having an unsaturated group.

Then, the reaction product having the unsaturated group (s) is hydrosilylated by reacting the product with a hydrosilane having a reactive silicon-containing group.

(ii) The oxyalkylene polymer having the unsaturated group(s) which has been prepared by the same method as (a) is reacted with a compound having a mercapto group and a reactive silicon-containing group.

(iii) With an oxyalkylene polymer having functional groups such as hydroxyl, epoxy or isocyanate groups, a compound having a reactive silicon-containing group and a functional group reactive with the functional groups of the oxyalkylene polymer is reacted.

Among the above methods, the method (i) and the method (ii) in which the polymer having the terminal hydroxyl group and the compound having the reactive silicon-containing group and the isocyanate group are reacted are preferable.

The oxyalkylene polymer (a) may be a straight or branched polymer and has a number average molecular weight of between 500 and 50,000, preferably between 1000 and 30,000.

The oxyalkylene polymer (a) has at least one reactive silicone-containing group, preferably 1.1 to 5 reactive silicon-containing groups on the average, in a molecule. When the number of the reactive silicon-containing groups is less than 1 (one) in a molecule, the resin composition has insufficient curing properties, while when it is too large, the network structure becomes too dense, and the cured resin composition does not have good mechanical properties.

Specific examples of the oxyalkylene polymer (a) are oxyalkylene polymers disclosed in JP-B-45-36319, JP-B-46-12154, JP-A-50-1 56599, JP-A-54-6096, JP-A-55-13767, JP-A-55-25 13468, JP-A-57-164123, JP-B-3-24450, and U.S. Pat. No. 3632557, U.S. Pat. No. 4345053, U.S. Pat. No. 4366307 and U.S. Pat. No. 4,960844, the disclosures of which are hereby incorporated by reference; and oxyalkylene polymers having a large molecular weight, for example, a number average molecular weight of at least 6000 and a narrow molecular weight distribution, for example, a Mw/Mn of 1.6 or less which are disclosed in JP-A-61-197631, JP-A-61-215622, JP-A-61-215623 and JP-A-61-218632.

The oxyalkylene polymers having the reactive silicon-containing group may be used independently or in combination of two or more of them. Alternatively, the oxyalkylene polymer may be blended with a vinyl polymer having a reactive silicon-containing group.

The oxyalkylene polymer with which the vinyl polymer having the reactive silicon-containing group may be prepared by the methods disclosed in JP-A-59-122541, JP-A-63-112642 and JP-A-6-172631. Preferably, the oxyalkylene polymer having the reactive silicon-containing group is blended with a copolymer having a reactive silicon-containing group and comprising an acrylate and/or methacrylate monomeric unit represented by the formula (5):

$$—CH_2—C(R^6)(COOR^5)— \quad (5)$$

wherein $R^5$ is a $C_{1-8}$ alkyl group and $R^6$ is a hydrogen atom or a methyl group and an acrylate and/or methacrylate monomeric unit having at least 10 carbon atoms in an alkyl moiety represented by the formula (6):

$$—CH_2—C(R^6)(COOR^7)— \quad (6)$$

wherein $R^6$ is the same as defined above and $R^7$ is an alkyl group having at least 10 carbon atoms.

Examples of $R^5$ in the formula (5) are alkyl groups having 1 to 8 carbon atoms, preferably 1 to 4 carbon atoms, more preferably 1 or 2 carbon atoms, such as methyl, ethyl, propyl, n-butyl, tert.-butyl and 2-ethylhexyl groups. The $R^5$ groups in a molecule may be the same alkyl group, or two or more different alkyl groups.

Examples of $R^7$ in the formula (6) are alkyl groups having at least 10 carbon atoms, preferably 10 to 30 carbon atoms, more preferably 10 to 20 carbon atoms, such as lauryl, tridecyl, cetyl and stearyl groups, alkyl groups having 22 carbon atoms, behenyl group, and the like. The $R^7$ groups in a molecule may be the same alkyl group, or two or more different alkyl groups, as in the case of the R5 groups.

The polymer chains of the vinyl copolymer comprise the monomeric units of the formulas (5) and (6). That is, the total content of the monomeric units of the formulas (5) and (6) is at least 50 wt. %, preferably at least 70 wt. % of the whole monomeric units of the polymer chain of vinyl copolymer.

The weight ratio of the monomeric units (5) to the monomeric units (6) is preferably between 95:5 and 40:60, more preferably between 90:10 and 60:40.

Examples of the monomeric units other than those of the formulas (5) and (6) are those derived from acrylic acids (e.g. acrylic acid, methacrylic acid, etc.), monomers having amide groups (e.g. acrylamide, methacrylamide, N-methylolacrylamide, N-methylolmethacrylamide, etc.), monomers having epoxy groups (e.g. glycidyl acrylate, glycidyl methacrylate, etc.), monomers having amino groups (e.g. diethylaminoethyl acrylate, diethylaminoethyl methacrylate, aminoethyl vinyl ether, etc.), acrylonitrile, styrene, α-methylstyrene, alkyl vinyl ether, vinyl chloride, vinyl acetate, vinyl propionate, ethylene, and the like.

The copolymer has preferably a number average molecular weight of between 500 and 100,000 in view of the easy handling.

The reactive silicon-containing group contained in the copolymer is a group of the formula (7):

$$\begin{array}{c} R^8{}_{2-a} \quad R^9{}_{3-a} \\ | \quad\quad | \\ —(Si—O)_{\overline{q}}SiX_b \\ | \\ X_a \end{array} \quad (7)$$

wherein $R^8$ and $R^9$ are the same or different and represent a substituted or unsubstituted monovalent organic group having 1 to 20 carbon atom or a triorganosiloxane group, q is an integer of 0 to 19, and X, a and b are the same as defined above.

A preferable reactive silicon-containing group is represented by the formula (8):

$$-\underset{|}{\text{Si}}-X_c \qquad (8)$$

wherein $R^9$ is the same as defined above, and c is 1, 2 or 3.

The copolymer has at least one reactive silicone-containing group, preferably at least 1.1, in particular at least 1.5 reactive silicon-containing groups on the average, in a molecule, and contains the reactive silicon-containing groups so that an apparent number average molecular weight per one reactive silicone-containing group is between 300 and 10,000, preferably between 300 and 4000.

Specific examples of the hydrolyzable group in the formula (7) are a hydrogen atom, halogen atoms, alkoxy, acyloxy, ketoximate, amino, amide, aminoxy, mercapto and alkenyloxy groups, and the like. Among them, the alkoxy groups such as methoxy and ethoxy groups are preferable.

Specific examples of the $R^8$ and $R^9$ groups in the formula (7) are alkyl groups (e.g. methyl, ethyl, etc.), cycloalkyl groups (e.g. cyclohexyl, etc.), aryl groups (e.g. phenyl, etc.), aralkyl groups (e.g. benzyl, etc.) and the like. The $R^8$ and $R^9$ groups may be a group of the formula: $R^4{}_3SiO-$ in which $R^4$ is the same as defined above. Among them, a methyl group is preferably for the $R^8$ and $R^9$ groups.

Furthermore, the blend of the oxyalkylene polymer and the vinyl polymer having the reactive silicon-containing group can be prepared by polymerizing a (meth)acrylate monomer in the presence of the oxyalkylene polymer having the reactive silicon-containing group. This method is disclosed in JP-A-59-78223, JP-A-59-168014, JP-A-60-228516 and JP-A-60-228517.

The epoxy resin (b) contained in the resin composition of the present invention may be any conventional one, and its examples are epichlorohydrin-bisphenol A epoxy resins, epichlorohydrin-bisphenol F epoxy resins, flame retardant epoxy resins (e.g. glycidyl ether of tetrabromobisphenol A, etc.), novolak epoxy resins, hydrogenated bisphenol A epoxy resins, glycidyl ether epoxy resins of bisphenol-A-proplylene oxide adducts, p-hydroxybenzoic acid glycidyl ether ester epoxy resins, m-aminophenol epoxy resins, diaminodiphenylmethane epoxy resins, urethane-modified epoxy resins, alicyclic epoxy resins, N,N-diglycidylaniline, N,N-diglycidyl-o-toluidine, triglycidyl isocyanurate, poly-alkylene glycol diglycidyl ether, glycidyl ethers of polyhydric alcohols such as glycerol, hydantoin epoxy resins, epoxidated products of unsaturated polymers (e.g. petroleum resin, etc.), and the like.

Among these epoxy resins, those having at least two epoxy groups in a molecule are preferable since they have high curing reactivity and their cured materials easily form three-dimensional networks. In particular, the bisphenol A epoxy resins and novolak epoxy resins are preferred.

The weight ratio of the oxyalkylene polymer (a) to the epoxy resin (b) [(a)/(b)] is between 1:100 and 100:1. When the ratio of (a)/(b) is less than 1/100, the impact strength and toughness of the cured material of epoxy resin (b) are not improved. When this ratio exceeds 100/1, the strength of the cured material of oxyalkylene polymer (a) is insufficient.

The preferable amounts of the oxyalkylene polymer (a) and the epoxy resin (b) in the resin composition of the present invention are not uniformly defined since they depend on the application of the curable resin composition. For example, preferably 1 to 100 wt. parts, more preferably 5 to 100 wt. parts of the oxyalkylene polymer (a) is used per 100 wt. parts of the epoxy resin (b) for improving the impact strength, flexibility, toughness and peel strength of the cured material of the epoxy resin (b). Alternatively, preferably 1 to 200 wt. parts, more preferably 5 to 100 wt. parts of the epoxy resin (b) is used per 100 wt. parts of the oxyalkylene polymer (a) for improving the strength of the cured material of oxyalkylene polymer (a).

The ketimine (c) contained in the resin composition of the present invention is a compound having a group of the formula (9):

$$R^{10}R^{11}C=N- \qquad (9)$$

wherein $R^{10}$ and $R^{11}$ are the same or different and represent a hydrogen atom, a substituted or unsubstituted alkyl group having 1 to 6 carbon atoms or a phenyl group.

The ketimine is present stably in the absence of moisture, while it is decomposed with moisture and forms a primary amine and a ketone. Then, the formed primary amine serves as a curing agent for curing the epoxy resin at room temperature.

A preferable example of the ketimine (c) is a compound of the formula (10):

$$(R^{10}R^{11}C=N)_rZ \qquad (10)$$

wherein $R^{10}$ and $R^{11}$ are the same, Z is an organic group, and r is 1, 2 or 3.

Examples of the organic group for Z are $C_1$–$C_{12}$ alkyl and $C_6$–$C_{24}$ aryl groups, which may be substituted with, for example, an amino group which is optionally substituted with an alkyl group having 1 to 6 carbon atoms or a phenyl group, a $C_1$–$C_4$ alkoxy group which optionally substituted with a $C_1$–$C_4$ alkoxy group, a polyoxyalkylene group, a silicon group having a hydrolyzable group (e.g. methoxy, ethoxy, acetoxy group, etc.), and the like.

The ketimine may be prepared through the condensation reaction of an amine compound and a carbonyl compound. Conventional amine and carbonyl compounds can be used for the synthesis of the ketimine.

Specific examples of the amine compound are diamines (e.g. ethylenediamine, propylenediamine, trimethylenediamine, tetramethylenediamine, 1,3-diaminobutane, 2,3-diaminobutane, pentamethylenediamine, 2,4-diaminopentane, hexamethylene-diamine, p-phenylenediamine, p,p'-biphenylenediamine, etc.), polyamines (e.g. 1,2,3-triaminopropane, triaminobenzene, tris(2-aminoethyl)amine, tetra(aminomethyl)methane, etc.), polyalkylenepolyamines (e.g. diethylenetriamine, triethylenetriamine, tetraethylenepentamine, etc.), polyoxyalkylene polyamines; aminosilanes (e.g. γ-aminopropyltriethoxysilane, N-(β-aminoethyl)-γ-aminopropyl-trimethoxysilane, N-(β-aminoethyl)-γ-aminopropylmethyldimethoxysilanes, etc.) and the like.

Specific examples of the carboxyl compound are aldehydes (e.g. acetaldehyde, propionaldehyde, n-butylaldehyde, isobutylaldehyde, diethylacetaldehyde, glyoxal, benzaldehyde, etc.), cyclic ketones (e.g. cyclopentanone, trimethylcyclopentanone, cyclohexanone, trimethylcyclohexanone, etc.), aliphatic ketones (e.g. acetone, methyl ethyl ketone, methyl propyl ketone, methyl isopropyl ketone, methyl isobutyl ketone, diethyl ketone, dipropyl ketone, diisopropyl ketone, dibutyl ketone, diisobutyl ketone, etc.), β-dicarbonyl compounds (e.g. acetylacetone, methyl acetoacetate, ethyl acetoacetate, dimethyl malonate, diethyl malonate, methyl ethyl malonate, dibenzoylmethane, etc.) and the like.

When the ketimine has an imino group, the imino group may be reacted with styrene oxide; glycidyl ethers (e.g. butyl glycidyl ether, allyl glycidyl ether, etc.); glycidyl esters, and the like.

The ketimines may be used independently or in combination of two or more of them.

The amount of the ketimine depends on the kinds of the epoxy resin and ketimine and is usually in the range between 1 and 100 wt. parts per 100 wt. parts of the epoxy resin.

Examples of the carbonyl compound (d) contained in the resin composition of the present invention are aldehydes (e.g. acetaldehyde, propionaldehyde, n-butylaldehyde, isobutylaldehyde, diethylacetaldehyde, glyoxal, benzaldehyde, etc.), cyclic ketones (e.g. cyclopentanone, trimethylcyclopentanone, cyclohexanone, trimethylcyclohexanone, etc.), aliphatic ketones (e.g. acetone, methyl ethyl ketone, methyl propyl ketone, methyl isopropyl ketone, methyl isobutyl ketone, diethyl ketone, dipropyl ketone, diisopropyl ketone, dibutyl ketone, diisobutyl ketone, etc.), β-dicarbonyl compounds (e.g. acetylacetone, methyl acetoacetate, ethyl acetoacetate, dimethyl malonate, diethyl malonate, methyl ethyl malonate, dibenzoylmethane, etc.) and the like.

The amount of the carbonyl compound (d) in the resin composition is between 0.1 and 50 wt. parts, preferably between 0.5 and 30 wt. parts per 100 wt. parts of the oxyalkylene polymer (a).

The resin composition of the present invention may optionally contain a curing catalyst (e) which promotes the curing reaction of the oxyalkylene polymer (a) having the reactive silicon-containing group. A wide variety of conventional silanol condensation catalysts (curing catalysts) can be used in the present invention.

The curing catalyst (e) may be various silanol condensation catalysts, and examples of the silanol condensation catalysts are titanate esters (e.g. tetrabutyl titanate, tetrapropyl titanate, etc.); tin carbonate salts (e.g. dibutyltin dilaurate, dibutyltin maleate, dibutyltin diacetate, tin octylate, tin naphthenate, etc.);

reaction products of dibutyltin oxide and phthalate esters; dibutyltin diacetylacetonate; organic aluminum compounds (e.g. aluminum trisacetylacetonate, aluminum trisethylacetoacetate, diisopropoxyaluminum ethylacetoacetate, etc.), chelate compounds (e.g. zirconium tetraacetylacetonate, titanium tetraacetylacetonate, etc.); lead octylate; iron naphthenate; bismuth compounds (e.g. bismuth-tris(2-ethyl hexanoate), etc.); amines (e.g. butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo[5.4.0]-undecene-7 (DBU), etc.) or salts of these amine compounds with carboxylic acids; low molecular weight polyamide resins obtained from polybasic acids and excess amounts of polyamines; reaction products of epoxy compounds and excess amounts of polyamines; silane coupling agents (e.g. γ-aminopropyltrimethoxysilane, N-(β-aminoethyl) aminopropylmethyldimethoxysilane, etc.), and the like. Furthermore, other known silanol condensation catalysts such as acidic catalysts and basic catalysts can be used. These catalysts may be used independently or in combination of two or more of them.

The amount of the catalyst (e) to be used is preferably between 0.1 and 20 wt. parts, more preferably between 1 and 10 wt. parts per 100 wt. parts of the oxyalkylene polymer.

When the amount of the catalyst (e) is too small in relation to the amount of the oxyalkylene polymer, the curing rate is low and the curing reaction does not proceed sufficiently. When the amount of the catalyst (e) is too large in relation to the amount of the oxyalkylene polymer, partial heat generation or foaming occurs during curing, and good cured materials may not be obtained.

The compound (f) having the reactive silicon-containing group means a low molecular weight silicone compound having a hydrolyzable group which is reactive in the presence of moisture and has a molecular weight of 500 or less. This compound has preferably at least one functional substituent. Examples of the hydrolyzable group are alkoxy, acyloxy, ketoximate, amino, aminoxy, amide, alkenyloxy groups, and the like. Examples of the functional substituent are epoxy, amino, acryl, mercapto groups and the like.

Specific examples of the compound (f) are silane coupling agents.

The silane compounds may be used independently or in combination of two or more of them.

The amount of the compound (f) having the reactive silicon-containing group is between 0.1 and 30 wt. parts, preferably between 0.5 and 10 wt. parts per 100 wt. parts of the oxyalkylene polymer (a).

The resin composition of the present invention may optionally contain various additives such as dehydrating agents, property-adjusting agents, fillers, anti-aging agents, and the like.

The addition of the carbonyl compound (d) to the resin composition comprising the oxyalkylene polymer (a) which comprises at least one silicon-containing group having at least one hydroxyl or hydrolyzable group bonded to a silicon atom, the epoxy resin (b) and the ketimine compound (c) improve the storage stability of the composition while maintaining the good properties of the composition such as tensile properties, adhesion strength, and adhesion failure state.

The present invention will be illustrated by the following Examples, which do not limit the scope of the present invention in any way.

EXAMPLE 1

A propylene oxide polymer having two methyldimethoxysilyl groups on the average in a molecule and a number average molecular weight of 10,000 (100 wt. parts), an epoxy resin (EPIKOTE 828 available from Shell Yuka Epoxy) (10 wt. parts) and calcium carbonate (120 wt. parts) were mixed under reduced pressure. To the mixture, a dibutyltin compound (STAN SB-65 available from SANKYO ORGANIC SYNTHESIS) (2 wt. parts), a ketimine (VERSAMINE K-13 available from HENKEL HAKUSUI) (4.8 wt. parts), dodecyl glycidyl ether (EPOLITE M 1230 available from KYOEISHA CHEMICALS) (3 wt. parts), vinyl trimethoxysilane (NUC SILICONE A 171 available from NIPPON UNICAR) (3 wt. parts), γ-glycidoxypropyltrimethoxysilane (NUC SILICONE A 187 available from NIPPON UNICAR) (2 wt. parts) and methyl isobutyl ketone (4 wt. parts) were added and stirred under reduced pressure, and a resin composition was obtained.

Storage stability of the composition was evaluated as follows:

An amount of the obtained composition was charged in a cartridge and kept standing at 50° C. for 2 weeks and one month. Then, the viscosity, tensile properties and adhesive strength under shear of the cured material were measured. All the tests were carried out at 23±1° C. and 55±5%RH.

The viscosity was measured with a BS type viscometer using a No. 7 rotor. The tensile properties were measured with a No. 3 dumbbell shape specimen according to JIS K 6301. The adhesive strength under shear was measured according to JIS K 6850.

The results are shown in the Table.

EXAMPLE 2

A resin composition was prepared in the same manner as in Example 1 except that a propylene oxide polymer having three methyldimethoxysilyl groups on the average in a molecule and a number average molecular weight of 18,000 was used.

EXAMPLE 3

A resin composition was prepared in the same manner as in Example 1 except that the epoxy resin was used in an amount of 30 wt. parts and the ketimine was used in an amount of 14.4 wt. parts.

EXAMPLE 4

A resin composition was prepared in the same manner as in Example 2 except that the epoxy resin was used in an amount of 30 wt. parts and the ketimine was used in an amount of 14.4 wt. parts.

COMPARATIVE EXAMPLE 1

A resin composition was prepared in the same manner as in Example 1 except that xylene was used in place of methyl isobutyl ketone.

COMPARATIVE EXAMPLE 2

A resin composition was prepared in the same manner as in Example 3 except that xylene was used in place of methyl isobutyl ketone.

All the results are shown in the Table.

2. A curable resin composition according to claim 1, which further comprises (e) a curing catalyst for the oxyalkylene polymer (a).

3. A curable resin composition according to claim 1, which further comprises (f) a compound having a reactive silicon-containing group other than the oxyalkylene polymer (a).

4. A curable resin composition according to claim 1, wherein said silicon-containing group is a group of the formula (2):

wherein $R^2$ and $R^3$ are the same or different and represent a $C_{1-20}$ alkyl group, a $C_{6-20}$ aryl group, a $C_{7-20}$ aralkyl group or a triorganosiloxy group of the formula: $R^4{}_3SiO$— in which $R^4$ is a $C_1{}_{20}$ monovalent hydrocarbon group provided that three $R^4$ groups may be the same or different, with the proviso that when at least two $R^2$ or $R^3$ groups are present, they may be the same or different; X is a hydroxyl or hydrolyzable group with the proviso that when at least two X groups are present, they may be the same or different; a is 0, 1 or 2; b is 0, 1, 2 or 3; p is an integer of 0 to 19; and "a" in the different —$SiR^2{}_{2-a}X_aO$— groups may be the same or different with the proviso that the sum of all "a" and "b" is at least 1 (one).

TABLE

|  | Original | | | | | | After keeping at 50° C. for 1 month | | | | | |
|---|---|---|---|---|---|---|---|---|---|---|---|---|
|  | Example No. | | | | Com. Ex. No. | | Example No. | | | | Com. Ex. No. | |
|  | 1 | 2 | 3 | 4 | 1 | 2 | 1 | 2 | 3 | 4 | 1 | 2 |
| Viscosity (Pa · s) | | | | | | | | | | | | |
| 1 rpm | 2040 | 4700 | 1810 | 4120 | 2160 | 2290 | 2020 | 4750 | 2220 | 5190 | 2500 | 5932 |
| 2 rpm | 1200 | 2610 | 1040 | 2300 | 1230 | 2680 | 1410 | 3090 | 1480 | 3470 | 1810 | 4140 |
| 10 rpm | 340 | 750 | 315 | 695 | 348 | 768 | 816 | — | 954 | — | 1070 |  |
| Increase of viscosity (2 rpm) | — | — | — | — | — | — | 1.2 | 1.2 | 1.4 | 1.5 | 1.5 | 1.5 |
| Tensile properties | | | | | | | | | | | | |
| $M_{50}$ (MPa) | 1.4 | 1.6 | 2.5 | 2.9 | 1.4 | 2.5 | 1.2 | 1.4 | 2.5 | 3.0 | 1.3 | 2.6 |
| $M_{100}$ (MPa) | 2.1 | 2.4 | 3.1 | 3.5 | 2.1 | 3.1 | 1.9 | 2.1 | 3.1 | 3.5 | 2.1 | 3.3 |
| $T_B$ (MPa) | 2.7 | 2.5 | 3.4 | 3.2 | 2.7 | 3.4 | 2.7 | 2.6 | 3.5 | 3.2 | 2.9 | 3.6 |
| $E_B$ (%) | 190 | 135 | 130 | 90 | 190 | 130 | 250 | 180 | 145 | 100 | 245 | 140 |
| Adhesion strength under shear (MPa) | 2.5 | 2.4 | 2.9 | 2.9 | 2.4 | 2.4 | 2.5 | 2.5 | 2.9 | 3.0 | 2.5 | 2.5 |
| [Failure state] | [CF] | [CF] | [CF] | [CF] | [CF] | [CF] | [CF] | [CF] | [CF] | [CF] | [CF] | [CF] |

Note:
CF = Cohesive failure.

What is claimed is:

1. A curable resin composition comprising
   (a) an oxyalkylene polymer which comprises at least one silicon-containing group having at least one hydroxyl or hydrolyzable group bonded to a silicon atom,
   (b) an epoxy resin,
   (c) a ketimine compound, and
   (d) at least one compound selected from the group consisting of aldehydes, cyclic ketones, aliphatic ketones, and β-dicarbonyl compounds.

5. A curable resin composition according to claim 4, wherein said silicon-containing group is a group of the formula (4):

wherein $R^3$, X and b are the same as defined in claim 4.

* * * * *